UNITED STATES PATENT OFFICE.

JEROME SMITH, OF CHICAGO, ILLINOIS, ASSIGNOR TO ARKON CARBON CO., OF CHICAGO, ILLINOIS, A CORPORATION OF COLORADO.

RUBBER COMPOUND.

952,150.  Specification of Letters Patent.  Patented Mar. 15, 1910.

No Drawing.  Application filed May 14, 1909.  Serial No. 495,893.

*To all whom it may concern:*

Be it known that I, JEROME SMITH, a citizen of the United States, residing at Chicago, in the county of Cook and State of Illinois, have invented a new and useful Improvement in Rubber Compound, of which the following is a specification.

In the many uses to which vulcanized rubber is applied it is rendered desirable for the purposes by reason of its possessing, besides elasticity, properties which lend to it tensile strength, and render it insulating to heat and electricity and resistant to deterioration under subjection to the influences of the atmosphere, sun-light, acids and alkalies.

The object of my invention is to provide a vulcanizable rubber compound which shall afford to the finished product made from it all the properties specified in an exceptionally high degree; and this I accomplish by employing as an ingredient in the compound the natural product hereinafter described.

I have discovered that the hydrocarbon substance known as grahamite, when reduced to a very finely pulverized condition and used in that condition as an ingredient in a rubber compound, acts as a binder and renders the vulcanized product very high in tensile strength and in heat and electric insulating properties, as also highly resistant to the oxidizing tendency of the atmosphere and of sun-light and to the deteriorating action of acids and alkalies. This grahamite, according to "*The Asphalt and Bituminous Rock Deposits of the United States*, by George H. Eldridge, Washington, 1901" is one member of a group of solid asphaltites, the group containing also albertite, impsonite, nigrite and uintahite, each of which is, like grahamite, susceptible of ready trituration to an impalpable powder, and may be used for my purpose as possessing the qualities of grahamite but in a lesser degree, so that the latter is preferred.

To produce my improved compound, the grahamite is reduced to a very fine degree of pulverization, preferably to about two hundred mesh, and mixed with other ingredients ordinarily used in compounding rubber. The following formula is one which I have successfully used and which will serve for guidance to those skilled in the art for practicing my invention.

Rubber _____ 20 lbs.
Shoddy (reclaimed rubber) _ 30 lbs.
Sulfur _____ 2 lbs.
Litharge _____ 5 lbs.
Grahamite (200 mesh) ____ 57 lbs.

This mixture is compounded in the usual way and is cured under subjection to steam-pressure of 60 lbs. for thirty-five minutes (when cured in a thickness of about one inch in a heavy mold). The vulcanized product possesses the superior qualities hereinbefore stated, which are imparted thereto by the grahamite as a binder, the proportion of which to the other ingredients is, according to the above formula, half and half, although this proportion may be varied without departure from my improvement.

The same formula may be employed for producing an excellent quality of hard rubber by increasing the sulfur ingredient to 25 lbs., curing for 30 minutes under steam-pressure beginning at 60 lbs. and gradually raising it to 75 lbs. and continuing the curing operation under the 75-pound pressure for a period of 2 hours; and thereafter cooling the product for one hour (this direction being based on a thickness of the material of about one and one-half inches cured in a heavy iron mold).

While I have described grinding the asphaltite separately and then mixing it in its pulverized condition with the other ingredients of the rubber compound, it is obvious that it is not necessary to do so, as the ingredients including the asphaltite may all be mixed together with the asphaltite in its original form and the mass ground together.

What I claim as new and desire to secure by Letters Patent is—

1. As an ingredient in a completed rubber-compound an asphaltite, as such, in a finely pulverized condition, for the purpose set forth.

2. As an ingredient in a rubber-compound, the substance grahamite in a finely pulverized condition, for the purpose set forth.

3. A rubber-compound consisting of a mixture of rubber, sulfur filler material and asphaltite, as such, in a finely pulverized condition.

4. A rubber compound consisting of a mixture of rubber, sulfur filler material and pulverulent grahamite, for the purpose set forth.

5. As an ingredient in a completed rubber-compound hard friable bitumen, as such, in a finely powdered condition, for the purpose set forth.

JEROME SMITH.

In presence of—
RALPH A. SCHAEFER.
JOHN WILSON.